J. T. WORLEY.
Safety Passenger-Cars.

No. 6,020. Reissued Aug. 18, 1874.

*Witnesses.*
C. H. Brown
Dr. H. Ellsworth

*Inventor*
*J. T. Worley*
*by his Attys.*
Hall & Ellsworth

THE GRAPHIC CO. PHOTO-LITH. 39 & 41 PARK PLACE, N.Y.

UNITED STATES PATENT OFFICE.

JAMES T. WORLEY, OF CLEVELAND, OHIO.

IMPROVEMENT IN SAFETY PASSENGER-CARS.

Specification forming part of Letters Patent No. 122,208, dated December 26, 1871; reissue No. 6,020, dated August 18, 1874; application filed January 7, 1874.

*To all whom it may concern:*

Be it known that I, JAMES T. WORLEY, of the city of Cleveland, in the county of Cuyahoga and State of Ohio, have invented certain new and useful Improvements in Safety-Cars for Railways; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
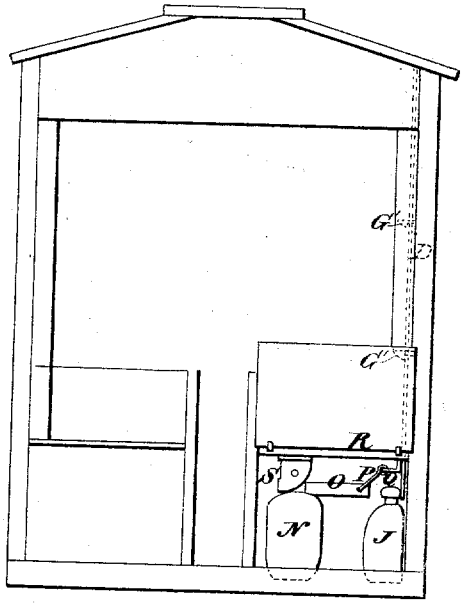
Figure 2:
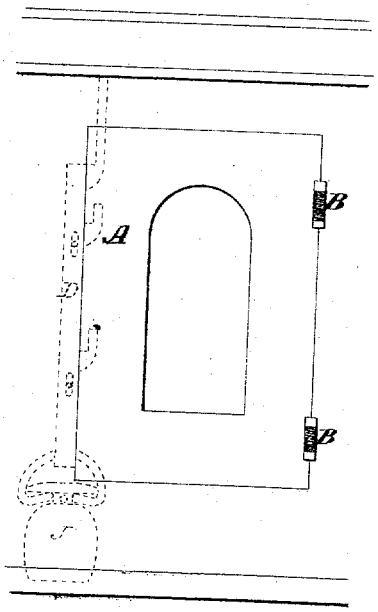
Figure 3:
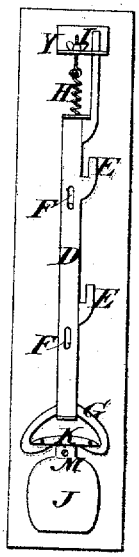

Figure 1 is a transverse section of a railway passenger-car provided with my invention. Fig. 2 is a side elevation of the same; and Fig. 3 is an elevation of the devices which, in this example of my invention, are employed to automatically release the safety door or windows.

Similar letters of reference in the accompanying drawings indicate the same parts.

My invention has for its object to provide a railway passenger-car with the means of escape for passengers in case of accident. To this end it consists, primarily, in providing the car with one or more doors or windows which shall open automatically, to afford a passage through the sides or ends when the car is suddenly stopped or accidentally thrown out of its proper position. The invention also consists in providing the car with doors or windows which shall open out automatically upon the upper side of the car when the latter is tipped or thrown over sidewise, so as to afford a ready exit for the passengers.

Having thus described the object of my invention and in what it consists, I will now set forth one means by which the same may be carried into effect.

In the accompanying drawings, A is a door or window attached to the side of the car by spring-hinges B, so as to open outward. D is an upright bolt or bar placed against the inner side of the car, opposite the swinging edge of the door, and adapted to slide vertically by the slots and bolts or screws F. A bracket, Y, secured to the inside of the car, receives an arm formed upon or attached to the upper end of the bar, and serves to guide the latter in its vertical movements. J is a weight, provided upon its upper end with a cross-bar, K, and pivoted at M to the inside of the car-seat R. The lower end of the bar D is connected to the cross-bar of the weight by means of a loop, G, so that when the weight swings from side to side it shall pull down the bar. The bar D moves downward against the tension of a spring, H, attached to its upper end, and connected by a swivel bolt and nut, I, to the guide-bracket Y. E are recesses or slots formed in the bar D to receive the catches C, affixed to the swinging edge of the door for the purpose of holding the latter closed. The guide-slots F in the bar are of sufficient length to permit its vertical movement for locking and unlocking the catches. It is held engaged with the catches by means of the spring H; but if the car is suddenly stopped or tipped endwise when in motion, the weight J swings on its pivot and draws down the bar, so as to release the catches and allow the door or window to be swung open by its springs.

By operating the nut I the tension of the holding-spring H is adjusted to regulate the movement of the bar to release the catches.

N is a second weight pivoted to a bracket, S, upon the under side of the seat R, so as to swing transversely of the car. It is provided with a lateral arm, O, which is attached to the lower end of the bar D by means of a link, P, and bracket Q.

When the car is tipped or thrown sidewise this weight operates the bar D to open the door or window upon that side of the car which is uppermost.

By this means a free exit is provided for the passengers, no matter upon which side the car is thrown. The swinging weights are represented as arranged under the seat R, but they may be applied to any part of the car which experience shall determine as most suitable. The number of doors or windows to be placed upon each side of the car is also a matter which experience will dictate. Three, however, on each side would seem to be sufficient.

Having thus described my invention, what I claim is—

1. A suspended weight in combination with a railway passenger-car, provided with one or more windows or doors adjusted to open in an automatic manner by the action of the weight, the car being suddenly stopped or accidentally thrown out of its proper position, substantially as described.

2. A suspended weight in combination with a railway passenger-car, provided with one or more side windows or doors adjusted to open in an automatic manner by the action of a weight, the car being tipped or thrown over sidewise, substantially as described, and for the purpose specified.

In testimony that I claim the foregoing I have hereunto set my hand.

JAMES T. WORLEY.

Witnesses:

NATHAN K. ELLSWORTH,
C. F. BROWN.